United States Patent [19]

Schultz

[11] 4,123,832
[45] Nov. 7, 1978

[54] METHOD AND DEVICE FOR ORTHOGONALLY WOVEN REINFORCING STRUCTURE

[75] Inventor: Frederick E. Schultz, Devon, Pa.

[73] Assignee: General Electric Company, Philadelphia, Pa.

[21] Appl. No.: 870,965

[22] Filed: Jan. 19, 1978

Related U.S. Application Data

[60] Continuation of Ser. No. 660,527, Feb. 23, 1976, which is a division of Ser. No. 430,758, Jan. 4, 1974, Pat. No. 3,993,817.

[51] Int. Cl.² ............... B32B 5/12; D06M 17/00; B65H 81/00
[52] U.S. Cl. ................... 28/143; 156/148; 156/169; 242/7.01; 242/118
[58] Field of Search ............... 428/64, 114, 225; 156/148, 169; 242/1, 7.01, 7.02, 7.21, 118, 118.1, 118.4, 118.5, 125.1; 28/143, 299

[56] References Cited

U.S. PATENT DOCUMENTS

| | | | |
|---|---|---|---|
| 1,384,572 | 7/1921 | Smith | 242/118.4 |
| 1,707,076 | 3/1929 | Clinton | 242/118.1 |
| 1,842,143 | 1/1932 | Bowen | 242/118.4 |
| 3,228,616 | 1/1966 | Grosh | 242/7.21 |
| 3,461,414 | 8/1969 | Fearon et al. | 242/118 X |
| 3,589,640 | 6/1971 | Mapes | 242/118.4 X |
| 4,038,440 | 7/1977 | King | 156/148 X |

*Primary Examiner*—Louis Rimrodt
*Attorney, Agent, or Firm*—James W. Johnson, Jr.

[57] ABSTRACT

A woven structure comprising at least a continuous band around an internal axis, suitable for impregnation with resin or for internal deposition of graphite from a reactive vapor, comprises axial threads, circumferential threads, and radial threads. The device employed to produce the structure comprises principally a series of flat rings or disks, aligned and slightly spaced from each other axially, having small apertures located around their circumference or one or more helical worms, with central openings, whose successive turns are similarly provided with apertures. Radial threads are passed through homologous apertures in successive disks, or successive turns of the helical worm, and are then drawn toward the central axis by wrapping of circumferential threads around them in the axial space between adjacent disks. Axial threads are then passed between the radial threads, and are drawn by further wraps of circumferential threads. The tightness of weave may be controlled by the tightness of wrap, permitting high porosity; or larger pores may be created by sacrificial insertions; and the process is particularly adapted to relatively stiff fibers, such as are desirable for reinforced structures. Solid insertions may be inserted as segments between the radial threads, or may be included as mandrels at the beginning of the weaving operation.

11 Claims, 13 Drawing Figures

METHOD AND DEVICE FOR ORTHOGONALLY WOVEN REINFORCING STRUCTURE

This is a continuation of application Ser. No. 660,527 filed Feb. 23, 1976, now abandoned which is a divisional of application Ser. No. 430,758 filed Jan. 4, 1974 now U.S. Pat. No. 3,993,817 Nov. 23, 1976.

BACKGROUND OF THE INVENTION

1. Field of the Invention

This invention pertains to the art of fiber reinforced solids.

2. Description of the Prior Art

Weaving is a prehistoric art. Its usual product is a layer of two classes of threads; reeds are woven e.g. in baskets, in a variety of patterns, but still in a single layered rather than a thick multilayered structure. In general, any initially plastic material applied to such woven structures is believed to having been for sealing or protection rather than the formation of a reinforced solid, despite the known use of unwoven straw to reinforce brick clay in time of the Egyptian oppression of the Hebrews.

Kruse et. al. (U.S. Pat. No. 3,322,868) exemplifies a solid woven structure having three mutually orthogonal classes of threads along Cartesian axes, intended for impregnation with resin or similar suitable material. No prior art is known to the applicant in which axial, radial, and circumferential threads are woven to form a structure of arbitrary thickness, with completely free choice of the relative numbers of threads of these three classes.

Publications reported in a novelty search of this invention are:

- D. Robbins, Structural Components Produced by Modified Weaving Techniques, Textile Institute and Industry, Mar. 1970.
- R. S. Barton, A Three-Dimensionally Reinforced Material, SPE Journal, Volume 24, May 1968.
- Weaving Tough Fabric with a New Dimension, Business Week, Aug. 31, 1968.
- P. D. Emerson, Modern Developments in Three-Dimensional Fabrics, Modern Textiles, Nov. 1969.

The last named reference describes a so-called "porcupine" structure in which radial threads extend from a central mandrel on which a fabric is woven, or are even drawn through the fabric after it is woven. They are not woven in the fabric in the sense that they are interlocked with other threads, but are apparently (so far as the description permits one to speculate) somewhat in the same situation as knitting needles in a piece of knitting in process.

SUMMARY OF THE INVENTION

A plurality of thin disks or rings each having a number of holes located around its circumference are suppported in axial alignment, with a slight space between adjacent disks; or a helical worm is provided, with a central aperture corresponding to the apertures in the disks, with the space between successive turns corresponding to the slight space between adjacent disks, and with holes located around its circumference, such holes in successive turns being in substantial axial alignment. Radial threads are passed through corresponding holes in successive disks, or turns of the helical worm (or, more briefly, the helix), so that the radial threads extend parallel to a line through the disks and normal to their plane, or to the helix axis. In either case, the term "central axis" or simply "axis" will be used to refer to such a line. But my invention permits the production of unsymmetrical products which have an analogous line through them, which is not necessarily even a straight line; since no simpler generally recognized name for such lines is known to me, the term "axis" will include them. If a hollow product is desired, a removable or sacrificial mandrel may be provided along the axis; or if a solid insert including the axis is desired, one may be provided, however, a hollow product may also be produced by a particular initial disposition of the radial threads, as described hereinafter. In any event, circumferential threads are provided by wrapping them around the radial threads through the space between adjacent disks or helix turns, and drawing the radial threads centrally inward. Axial threads may be inserted between the radial threads; then more circumferential threads may be wrapped. Additional radial threads may be inserted at any stage of the work. The tightness of the weave may be controlled by controlling the tension of the circumferential wrap.

A particular use of my invention is in the formation of a refractory solid e.g. of graphite, either by graphitization of an organic compound such as a resin or pitch which impregnates the woven structure, or by deposition of graphite directly upon the woven structure by pyrolysis of gas. Graphite fibers are desirable threads for such a purpose, and it is a virture of my method that it does not require the bending of such threads over a small radius (as would be required e.g. in a shuttle of a size suitable for the size of product possible with my invention) nor does it impose on the thread the somewhat unpredictable tensions which throwing a shuttle might produce. These properties are also beneficial in weaving stiff threads of other materials, such as silica (which is known as a substrate for deposition of graphite) or boron, boron carbide, composite fibers, and numerous others.

DESCRIPTION OF THE PREFERRED EMBODIMENTS

Figure 1:
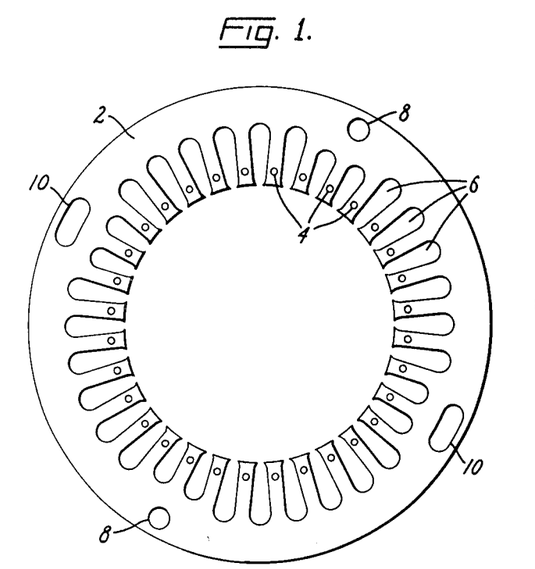
FIG. 1 represents a disk which is a part of the apparatus disclosed.
Figure 2:
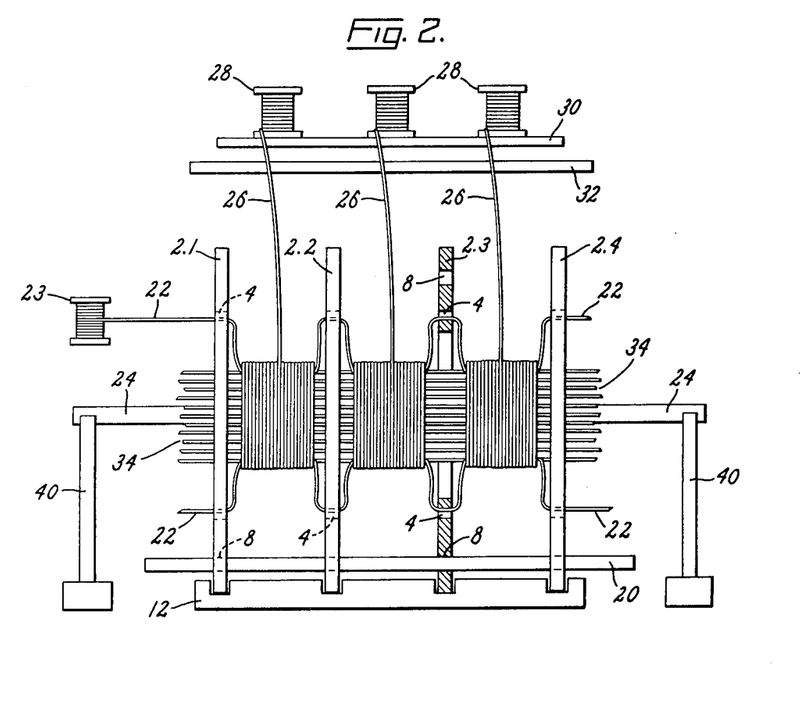
FIG. 2 represents a partly disassembled and partly sectioned apparatus as used in practicing my invention.
Figure 3:
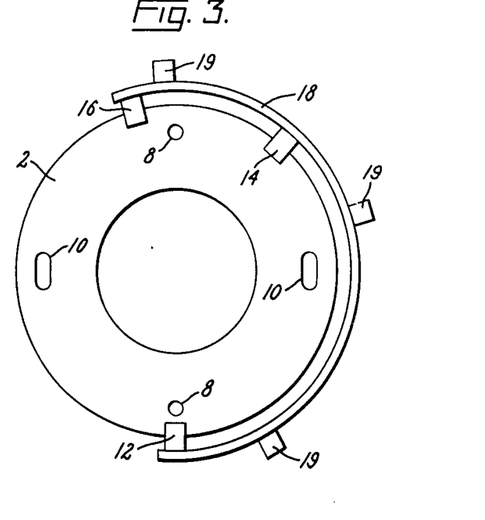
FIG. 3 represents a different aspect of the apparatus represented in FIG. 2.

FIG. 1 represents a part suitable for the apparatus represented in FIGS. 2 and 3. It is a ring-shaped disk 2, conveniently of metal sheet, and need be only thick enough for stiffness and strength adequate for very moderate stresses—a few hundredths of an inch of thickness will prove suitable. Around its inner circumference there are a plurality of apertures designated as thread guides 4, thirty-two in number in the particular example. It is desirable that the total number of thread guides be a multiple of a power of two, since it is convenient in practice to begin a piece with only a small number of thread guides, e.g. four or eight, in use and then to increase that number by doubling it. Not essential but convenient are recesses 6 which facilitate passage of threads by a hooked needle through a number of such disks aligned axially, particularly when the workpiece has grown to such a size that it fills a large part of the central aperture of the disk. Dowel holes 8 permit insertion of a dowel rod to rotate disk 2 (as will be described relatively to FIGS. 2 and 3) and clearance slots 10 permit passage of a dowel which can drive disk 2 but with a certain amount of lost motion if the direction of drive is reversed. Thus a plurality of disks 2 may be arranged axially so that the dowel holes 8 of some are aligned with the clearance slots 10 of others. A dowel rod 22 extending through all the disks 2 will rotate them all together so that certain steps may be performed; but then it may reverse the direction of those disks which are driven through dowel holes 8 and drive them by an amount corresponding to the width of clearance holes 10 before beginning to drive the disks which are driven through clearance holes 10. Thus the two categories of disks 2 will alter their relative positions for two possible directions of rotation.

FIG. 2 represents four disks 2, numbered individually 2.1, 2.2, 2.3, and 2.4 arranged about a common central axis, resting in slots of a support comb 12. FIG. 3 represents a profile view of such an assemblage of disks supported by combs 12, 14, and 16 which are held in rigid relation by arcs 14, of which only the nearest is visible, since in orthographic projection it will mask the others. The arcs 18 may conveniently be held in alignment by battens 19, or by combs 12, 14 and 16 themselves, and may be supported in any convenient manner. FIG. 2, for clarity, omits combs 14 and 16 and arcs 18. Comb 16 is preferably fastened to arc 18 by some removable fastening, such as a cap screw, so that comb 16 may be released readily if it is desired to replace disks 2.

Referring specifically to FIG. 2, a dowel 20 is represented extending through dowel holes 8 of all disks 2 (i.e., 2.1, 2.2, 2.3, and 2.4, 2.3 being sectioned centrally). For clarity, the spacing between the disks 2 is shown greater than would ordinarily be desirable. In beginning the production of a workpiece, radial threads 22 are drawn from stores 23 and threaded through aligned thread guides 4 of disks 2, extending straight from one disk 2 to the next. The free end of each radial thread 22 is then folded back so that it will be anchored by further windings to be applied. A mandrel 24 may be inserted centrally through the disks 2 along their axis. A circumferential thread 26 is drawn from a bobbin 28 (which constitutes a sotre of such thread), which may desirably be provided with some conventional tension mechanism, and is carried over a smooth feed bar 32. It is then passed in a loop between disks 2.3 and 2.4 outside of radial threads 22, and several turns of it are thus wrapped. The loop is then tightened to draw radial threads 22 inward to the center. (A small weight may conveniently be attached to the end of circumferential thread 26 after this operation to retain it.) The loop is cemented in place, fixing both circumferential thread 26 and radial threads 22 in place. The excess free end of circumferential thread 26 may then be severed. The process may then be repeated in the space between disks 2.3 and 2.2. This sequential procedure is necessitated in practice by the friction of radial thread 22 in its passage through thread guides 2 and by friction between radial thread 22 and circumferential thread 26; if the radial thread 22 could slide with negligible friction, it would be possible to perform all the steps simultaneously. If more than a single course of circumferential thread is to be applied, the winding of subsequent layers of it between disks 2.4 and 2.3 can obviously occur simultaneously with the winding of the first wrapping between disks 2.3 and 2.2. However, the stepwise procedure facilitates the application of different numbers of turns of circumferential thread 26 between different pairs of adjacent disks 2 to produce a structure varying in diameter along its axis.

While it is evident that the radial threads 22 will necessarily lie close to disks 2, it is possible and often desirable to shift the axial position of disks 2 on the supporting combs 12, 14, and 16 so that in subsequent winding (and particularly when additional radial threads 26 are applied) the axial position of the radial threads 22 will be varied.

When the desired number of circumferential threads 26 in a given layer has been wrapped between each pair of disks, axial threads 34 may be threaded between adjacent radial threads 22, conveniently by leading them through with a conventional hooked needle, and further wraps of circumferential threads 22 may be applied. If e.g. a variation in diameter of the workpiece is desired from one end to the other with constant wall thickness, the axial threads 34 may be introduced between two adjacent disks 2 and carried out to the larger diameter end in order that there will be a larger number of axial threads 34 where they must extend over a larger arc of the workpiece. The number of axial threads 34 between radial threads 26 may differ around the piece if an unsymmetrical product is to be generated, although other ways of achieving asymmetry will be described later in this description.

Additional circumferential threads 26 are then wrapped around the newly added axial threads by inserting dowel 20 and rotating the disks as a unit. In this manner, by insertion of dowel 20 and by rotating the disks as a unit, an equal number of turns of circumferential threads 26 are applied between each adjacent pair of disks 2. As previously discussed, with respect to the winding of subsequent layers of circumferential threads, the possibility still exists for wrapping all of the circumferential threads 26 simultaneously if no new radial threads 22 are to be added.

Initially the number of radial threads 22 threaded through thread guides 4 of disks 2 may be much less than the total number of thread guides 4. For example, with 32 thread guides per disk, initially only every fourth thread guide 4 in each disk 2 may be threaded, giving only eight radial threads in the central part of the work. As the diameter of the work increases, the spacing between the radial threads at the work surface will increase. When it reaches its desired maximum, additional radial threads 22 may be threaded, preferably, if a symmetrical workpiece is being produced, through those thread guides 4 which are half-way between the thread guides 4 already threaded. These newly threaded radial threads 22 will be straight, extending from one disk 2 to the next. Repetition of the stepwise wrapping process for more circumferential threads 26 will draw them down into radial position. More axial threads 34 may then be added between wrappings of circumferential threads 26; and when the diameter of the work has been increased, by alternate wrappings of circumferential threads 26 and insertions of axial threads 34, to such a point that more radial threads 22 are required, the remaining unfilled thread guides 4 of the disks may be threaded with more radial threads 22, and drawn down into a radial position by further wrapping of circumferential threads 26.

Figure 4:
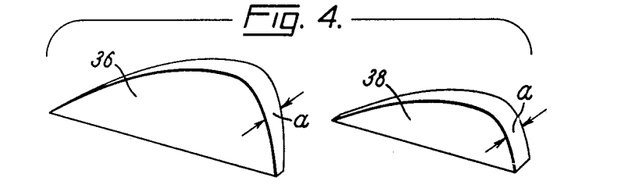
FIG. 4 represents typical parts to be inserted in the product of my invention.

It is also possible to insert, in the same general manner as axial threads 34 are inserted, segmented inserts 36 and 38 of a type generally represented in FIG. 4. As is shown, they may vary in radial height along their axial dimension, so that if enough of them are used to form a substantially completely circular insertion the diameter of the assemblage of inserts 36 will vary along the axis. When more circumferential threads 26 are wrapped over them, there will be produced a workpiece whose diameter will vary along its axis. It should be observed that the thermal expansion of common graphite is sufficiently greater than that of graphite fibers to preclude its use in a structure which is to be heated subsequently, as in graphitization. However, if for some reason it is desired to have hollows in the final product corresponding to the inserts 36 they may be made of some sacrificial material which will become volatile during the high-temperature graphitization process. It will be observed that inserts 36 and 38 are substantially the same in shape, except that 38 represents essentially the result of cutting off the lower part of 36. The dihedral angle alpha is the same for both, and must clearly be equal to the angle between adjacent radial threads 26 between which insert 36 or 38 is to be inserted. However, insert 36 is intended to be applied to a piece of work at a relatively early stage in its production and hence has greater radial depth than insert 38, which is to be applied at a later stage of growth of the workpiece.

The mandrel 24, as a matter of operational convenience, may be made long enough to rest upon supports 40 to hold it centered, as represented in FIG. 2. As is discussed with reference to FIGS. 12 and 13, mandrel 24 may be omitted, and replaced by a central core of axial threads 34 supported by radial threads 22 strung directly across a disk 2.

Figure 5:
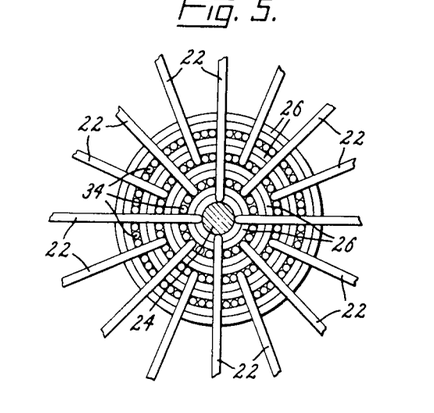
FIG. 5 represents an example of the type of woven structure produced by the use of the apparatus represented in FIGS. 2 and 3.

While a great many variations in weave patterns are possible, for completeness FIG. 5 represents a section or end view of a weave produced by the method and apparatus described. The particular plane chosen for the representation is one at which the radial threads 22 lie exposed. Four such radial threads 22 lie against the mandrel 24, drawn against it by the first course of circumferential threads 26 (represented as two threads thick) around which the first set of axial threads 34 are placed. If, as mentioned above, mandrel 24 is replaced by a central core of axial threads 34, radial threads 22 may extend through the central core. Four more radial threads 22 extend to the first set of axial threads 34, being bound, together with the first set of axial threads 34, by the next course of circumferential threads 26. Beyond this second course of circumferential threads 26 there lies the second set of axial threads 34, at which eight more radial threads 22 terminate. Around these there is wound the third course of circumferential threads 26. Upon this third course of circumferential threads 26 there lies a third set of axial threads 34, which are bound by a final course of circumferential threads 26. This representation demonstrates a possible geometric arrangement of the various classes of threads. Grinding and polishing, in the manner of a metallographic sample, an actual graphitized sample of the product of this disclosure does in fact show the various classes of threads, with their boundaries visible in the mass of graphite added by the later graphitizing process. This representation of FIG. 5 is, of course, merely exemplary of a single weave pattern.

In the description of the process of using the apparatus represented in FIGS. 2 and 3, little emphasis was laid upon the use of clearance slots 10. This will now be discussed. In arranging the various disks 2 in the apparatus of FIG. 2, disks 2.1 and 2.3 are arranged as shown in FIG. 2, with dowel 20 passing through their dowel holes 8, but disks 2.2 and 2.4 are arranged so that their clearance slots 10, rather than their dowel holes 8, are aligned to pass dowel 20. Prior to threading any radial threads 22 through the thread guides 4, the dowel 20 is moved in a chosen direction so that is presses against dowel holes 8 and clearance slots 10 through which it passes. Radial threads 22 are then threaded through thread guides 4 as previously described, and circumferential threads 26 are wound in a first course by rotating the disks by motion of dowel 20 in the chosen direction, drawing radial threads down into a truly radial position, as has been described. The first course of axial threads 34 may then be inserted, between the radial threads 22 in each disk. If now the next course of circumferential threads 26 is wound by moving dowel 20 in a direction opposite to that originally chosen, disks 2.1 and 2.3 will move immediately, but disks 2.2 and 2.4 will not move until dowel 20 has moved in their clearance slots 10 through the full length of clearance slot 10. Thus their radial threads 22 will be displaced or skewed with respect to the analogous radial threads 22 in disks 2.1 and 2.3, and the axial threads 34 will be twisted or skewed between alternate disks 2. After the second course of circumferential threads 26 has been wound, more axial threads 34 may be added which will be initially straight relative to the previous course of axial threads 34. If the next course of circumferential threads 26 is now wound by moving dowel 20 in the originally chosen direction, there will again be a displacement of disks 2.2 and 2.4 relative to disks 2.1 and 2.3, at least partially straightening the formerly skewed previous course of axial threads 34, and skewing in the opposite direction the last inserted course of axial threads 34. The circumferential length or extent of clearance slot 10 should correspond to the angular displacement desired between adjacent disks 2, which will approximate the angular spacing of adjacent radial threads 22. In other words, the angular displacement of the adjacent disks 2 should be such that, relative to a disk 2.1, the disk 2.2 is displaced by such an amount that each radial thread 22 in disk 2.1 is aligned with a radial thread 22 in disk 2.2. It is, of course, possible to provide a disk 2 with several clearance slots 10 of different angular spacings, so that the angular displacement between adjacent disks 2 may be varied by placing dowel 20 in different ones of clearance slots 10. In this case, a disk 2 which is not to be driven by clearance slots 10 must have matching drive holes 8 to permit insertion of the dowel 20 through the entire assembly. It is to be noted that angular displacement between adjacent disks 2 is optional, not compulsory, and may be avoided by simply maintaining the same direction of rotation by dowel 20 in successive operations.

While this latter description of a method for alternately displacing radial threads 22 at different axial positions, relatively to one another, will clearly produce a heightened interweaving of the radial threads 22 and the axial threads 34, it must be recognized that even when this skewing is not utilized, the axially oriented part of each radial thread 22 which lies beneath a circumferential wrap of threads 26 is thereby intimately woven as part of the entire structure. This characteristic feature of my invention retains the radial threads 22 much more surely than is possible in some prior art structures in which a so-called "porcupine" structure is produced by the simple insertion of radial threads into a woven structure which surrounds them but does not otherwise interlock with them.

Figure 6:
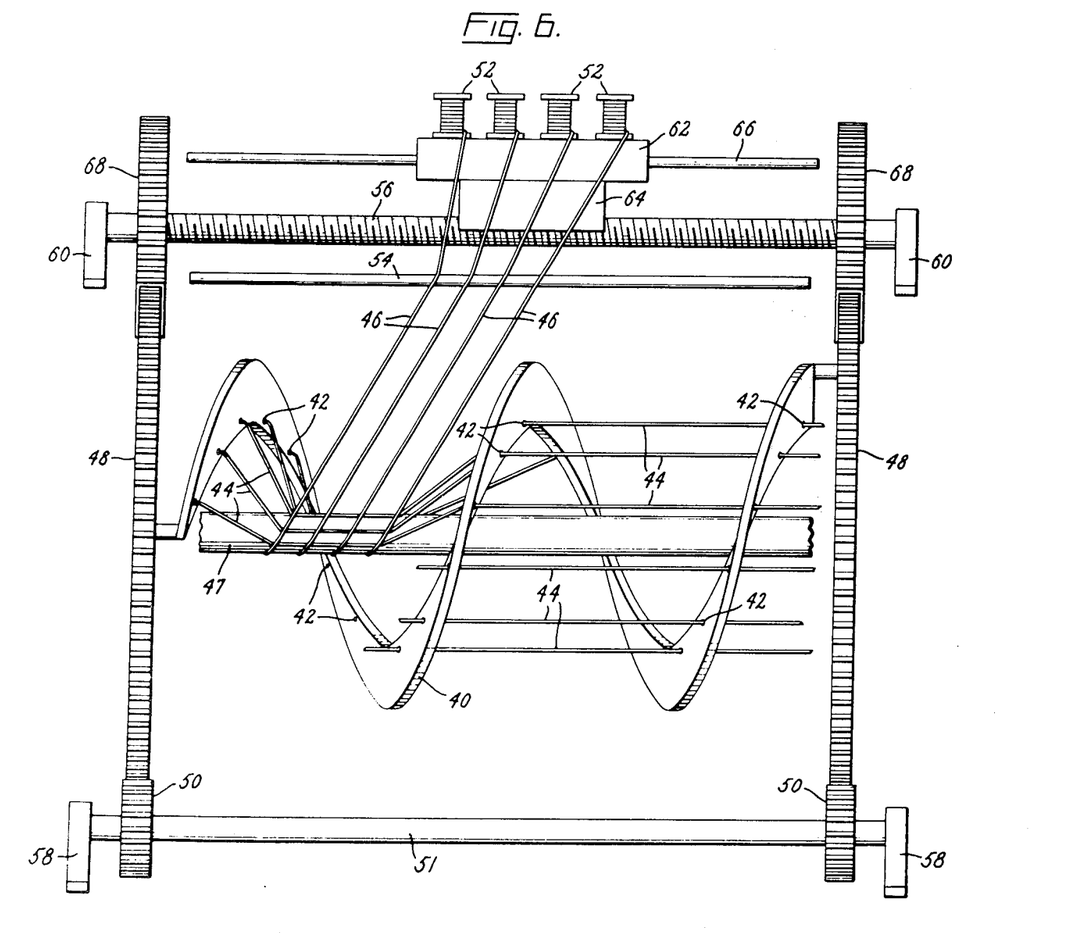
FIGS. 6 and 7 represent two different views of an alternate form of the apparatus of my invention.
Figure 7:
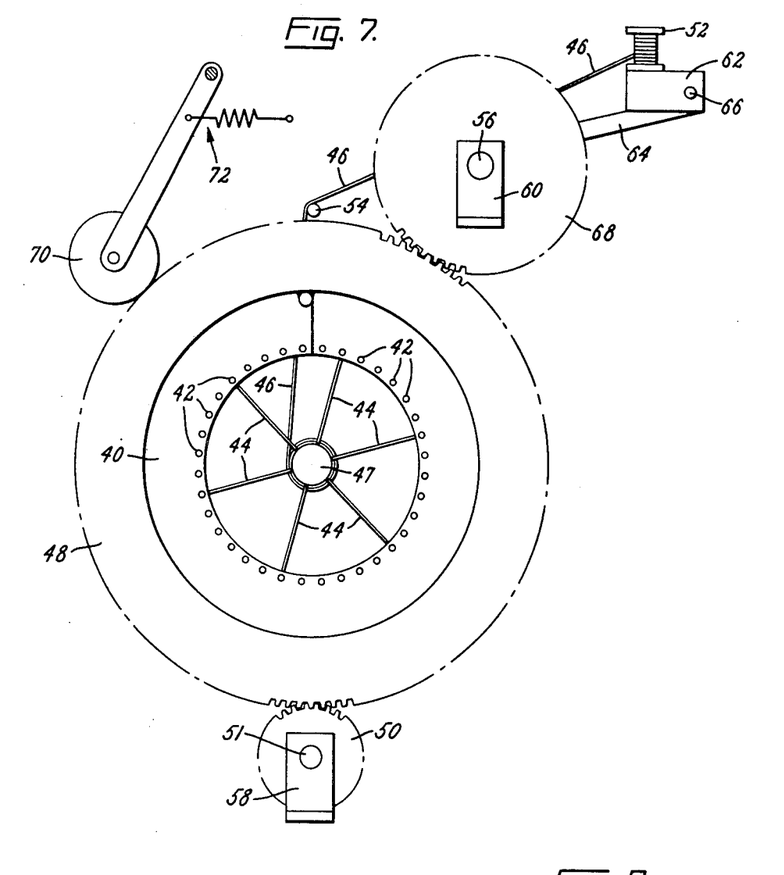

An alternative form of apparatus to that represented by FIGS. 1 and 2 is represented by FIGS. 6 and 7. In this the disks 2 are replaced by a helix 40 (which may be formed by rolling a wedge-shaped piece of stock, or by radially slitting disks such as 2, and welding or otherwise joining the slit edges of two disks 2 and repeating this operation until a helix is produced with a number of turns equal to the number of slit disks 2 so joined). Thread guides 42, completely analogous with thread guides 4, are provided near the inner periphery of helix 40, and radial threads 44 are threaded through thread guides 42 in a manner analogous with the threading of radial threads 26. However, the wrapping of circumferential threads 46 to draw radial threads 44 down into an approximately radial position is somewhat restricted in that as helix 40 is rotated the circumferential thread 46 must progress with the same pitch as the pitch of the helix 40. To achieve the equivalent of the wrapping of a multiplicity of turns of circumferential threads 26 between two disks 2, it is convenient to provide a number of circumferential threads 46 side by side so that a single rotation of helix 40 will apply a number of wraps of circumferential threads equal in number to the number of individual circumferential threads 46. It is to be noted that in FIG. 6 the pitch of the helix 40 has been exaggerated beyond that which would normally be used, to permit greater clarity of illustration.

One characteristic of the use of a helix 40 instead of the disks 2 is that the repeated severing and cementing of the circumferential threads 46 is obviated, the rotation of helix 40 being merely continued to add wraps progressively along the axis. This also has the advantage that the drawing down of a given radial thread 44 will occur progressively at each turn of the helix 40. Since helix 40 is a single unit which may be rigid, its mounting for rotation may be simply two rings 48 attached to each end; these may rest in combs as do disks 2, for rotation by hand. But it may well be more convenient to have them rest in rollers (or on pinions 50, in which case the rings 48 will be externally toothed to match the pinions) keyed to a common shaft 51 which may be rotated to drive helix 40. A store of circumferential threads 46, conveniently of spools 52 which may be provided with conventional friction drags to maintain desired tension, is necessary, preferably with a smooth feed bar 54 to align the threads 46 for wrapping. Such a store may be traversed by a feed screw 56 rotatably driven by shaft 51, to insure that the threads are fed at the proper helix angle.

These features are represented in FIG. 6. Shaft 51 is supported by pillow blocks and lead screw 56 is supported by pillow blocks 60. Spools 52 are supported on a carriage 62, which has an apron 64 internally threaded to engage the threads of lead screw 56, and a way 66 upon which it slides. Since rings 48 are most conveniently left unencumbered with a central shaft, they rest upon pinions 50 and upon pinions 68 keyed to lead screw 56, so that the rotation of shaft 51 also rotates lead screw 56 via the train of pinions 50, rings 48, and pinions 68. To lock rings 48 more positively in their desired position, idler pinions 70 may be provided as represented in profile view FIG. 7, the idler pinions 70 not being represented in FIG. 6 for better clarity. The idler pinions 70 are preferably supported by releasable means to facilitate removal and replacement of rings 48 and helix 40; in FIG. 7 they are represented as retained in place by a pivoted lever held by a spring assembly 72.

While only a single helix 40 has been represented, it is evident that it is possible to attach to rings 48 more than one helix 40, in a manner analogous with the formation of double and triple threads. In such case, alternative procedures exist. With the single helix 40, there is only a single winding path for circumferential threads 46; but with two helixes there are two paths, and with three helixes there are three paths.

One may provide circumferential threads 46 in all paths simultaneously, and wind them in all paths in the same operational step. However, the possibility exists of winding circumferential threads 46 in only one path, leaving the other path unfilled. Additional axial threads may then be inserted, and the second path may then be wound with circumferential threads 46, which will cause the axial threads to lie upon the circumferential threads 46 in the first path, and bend down to lie beneath the circumferential threads 46 in the second path, producing an increased degree of interlocking of the axial and circumferential threads Since the circumferential threads 46 will necessarily be wound at the helix angle, as a further refinement the radial threads 44 may be threaded through thread guides 42 in successive turns of helix 40 which are not aligned with the axis of the work, but rather lie on a helix which is orthogonal to the helix 40. This procedure will cause that part of each radial thread 44 which lies under the circumferential threads 46 to be truly orthogonal to the circumferential threads 44. This is, of course, merely a particular instance of the flexibility of thread arrangement which my invention permits.

Figures 8, 9:
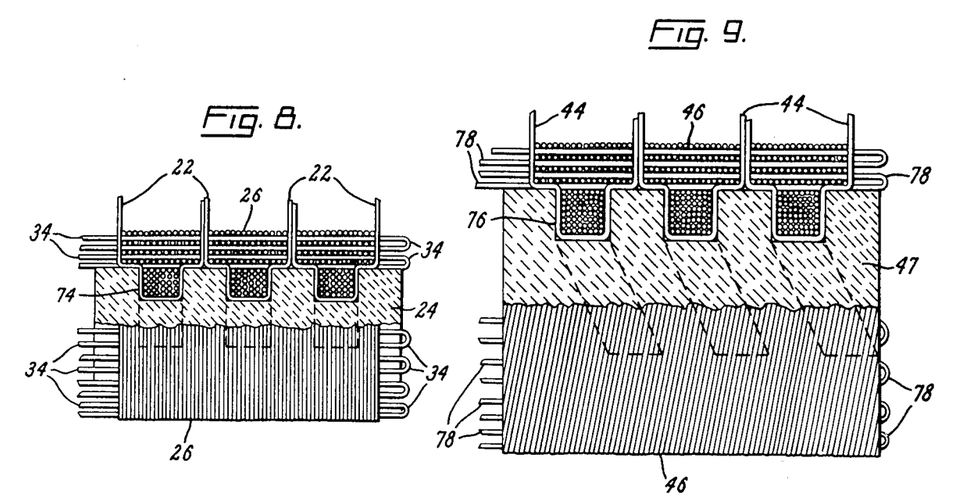
FIGS. 8 and 9 represent ways of forming woven pieces with internal grooves and spirals.

FIG. 8 represents in section a way of producing internally grooved or threaded workpieces. The sacrificial mandrel 24 may be provided with grooves 74 in which the circumferential threads 26 are wound, drawing the radial threads 22 into the groove. Similarly, FIG. 9, mandrel 47 may be chased with a spiral groove 76 into which radial threads 44 will be drawn by circumferential threads 46. Sacrificial removal of either mandrel from the completed workpiece will leave an internally grooved workpiece for the product of FIG. 8, or an internally threaded workpiece for the product of FIG. 9. Axial threads 34 in FIG. 8 and 78 in FIG. 9 do not appear in the sections, since they would necessarily lie behind the radial threads 22 and 44; but they are shown protruding from the work in each of the referenced figures.

Figure 10:
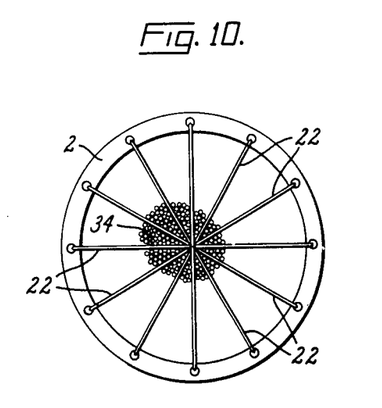
FIGS. 10 and 11 represent two different ways of producing asymmetrical woven structures according to my invention.
Figure 11:
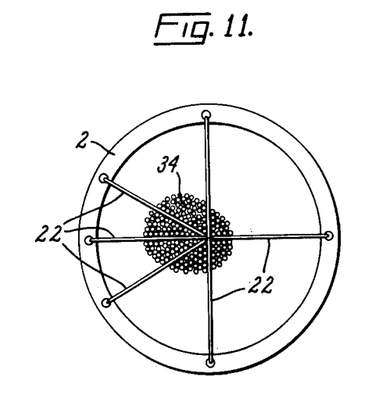

The description of my method and apparatus, purely because of the need of terms of reference, may appear to imply that it is biased toward production of circularly symmetrical products. It is not. Perhaps the most readily understood way of adding bulk to one side of the axis is to employ radial threads symmetrically distributed in angle around the periphery of either disks 2 or helix 40, and provide in the spaces between different adjacent radial threads different numbers of axial threads, as represented in FIG. 10. This produces a varying ratio of axial to radial threads, which must be considered in some degree a limitation. An alternative which avoids this limitation is to distribute the radial threads nonuniformly in the ring or helix, so that the angles between various pairs of adjacent radial threads differ. When equal numbers of axial threads are placed between each such pair of radial threads, the depth of the resulting layer of axial threads will be less for a larger angle between the radial threads. This is represented in FIG. 11.

Figure 12:
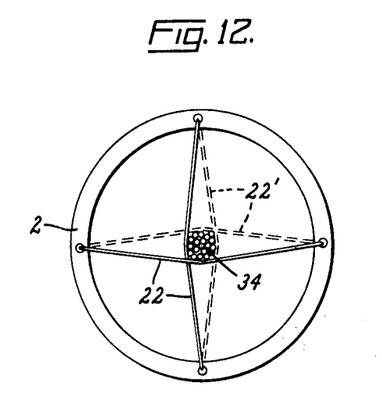
FIGS. 12 and 13 represents ways of forming a central structure for beginning weaving without the use of a mandrel.
Figure 13:
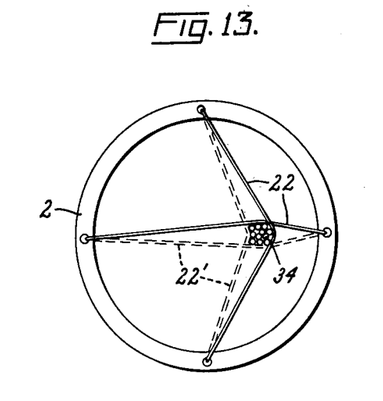

A further improvement is described with reference to FIG. 12 and 13. FIG. 12 illustrates how, in beginning the formation of a workpiece, radial threads may be threaded approximately diametrically across a disk 2, to enclose a central portion in which axial threads may be inserted to form a starting core equivalent to a mandrel. FIG. 13 illustrates how this same general procedure may be applied to produce an off-center enclosure. By employing the procedure of FIG. 12 in one disk 2, and that of FIG. 13 in an adjacent disk 2, a curved workpiece may be produced. Such a curved workpiece will not have a straight central axis, and yet it is evident that e.g. the axial thread in such a piece will mark a curved line which may reasonably be described as the axis of the workpiece, despite the fact that it is not a straight line. If a similarly shaped mandrel is used instead of a bundle of axial threads, a curved line passing through the centroids of its various cross sections may equally logically be described as its central axis. The concept is clear, but the language requires the extended definition here given to describe it.

While the description with reference to FIGS. 12 and 13 has been in terms of the use of disks 2, the same principles may be applied with respect to successive turns of a helix 40.

The graphitization of the woven structure produced as here disclosed may be accomplished by at least two known processes. In the first such method, the woven structure is heated in a carboniferous gaseous atmosphere which causes the deposition of graphite upon exposed surfaces. To permit complete permeation of the woven structure by such an atmosphere, initial evacuation prior to introduction of the carboniferous gases may be desirable. U.S. Pat. No. 3,369,920 describes such a deposition process. In the second method, the woven structure, after evacuation, is impregnated with an organic resin or pitch solution, or with ingredients which will react to form such a resin, and subjected to temperatures sufficient to cause decomposition of the resin and conversion of the resulting residue to graphite. The general use of such graphitized products is for exposure to high temperatures, including those accompanied by high gas velocities such as occur in rocket nozzles or during re-entry of space vehicles through the earth's atmosphere.

The actual benefits obtained by the use of woven structures as a base for incorporation in graphitized structures are believed to depend upon the high tensile strength manifested by the threads of which the woven structures are formed. It is supported that their presence tends to prevent massive fracture and spalling of the later formed graphite surrounding the threads. This would account for desirability of a structure in which the threads of various classes are orthogonal to each other at their intersections or proximity points. It is also possible that epitaxy in the formation of graphite upon the pre-existing woven threads may cause an interlocking structure in the later deposited graphite which would be expected to produce greater strength and resistance to gaseous abrasion in the entire structure.

Since various embodiments of my invention have been disclosed, it is desirable to define certain generalized terms for its definition. As either a solid mandrel or a bundle of axial threads may be employed as a base for the initial winding operations, the term "core" may be employed to include both. As has been explained, there exists a need, for reference purposes, to describe a line which in a curved structure will not be a straight line, which extends through the interior of the structure; this may be described generically as an internal axis. Axial threads may be so woven that they are not exactly parallel to the part of the internal axis nearest them, but will still have a nonzero projection on the internal axis and will extend generally along the axis, as a road between two towns extends generally along the straight line joining the towns; this idea will be expressed by the statement that they extend in the direction of the internal axis. Similarly, circumferential threads 26 in the embodiment represented in FIG. 2 may be truly normal to the internal axis of the woven structure; but circumferential threads 46 in the embodiment of FIG. 6 will spiral around the internal axis with a nonzero projection on normals to the internal axis; this may be expressed by describing them as being substantially normal to the internal axis.

Similarly, dowel holes 8 and clearance slots 10 form a common class of drive apertures, in which dowel holes 8 fit the rod closely, and clearance slots 10 are circumferentially extensive, and fit the rod with circumferential clearance—that is, there is lost motion for circumferential or angular relative motion (as distinct from radial or axial motion) of the rod and the clearance slot.

I claim:

1. A method for forming a predetermined dimensional woven structure having threads in an axial direction, threads in a radial direction and threads in a circumferential direction, comprising the steps of:
   (a) providing a core having an internal axis;
   (b) forming a plurality of radial threads extending initially in the direction of the internal axis and spaced therefrom at a distance greater than the maximum desired radius of the predetermined dimensional woven structure;
   (c) wrapping a plurality of circumferential threads around the radial threads and the core to draw the radial threads down partly substantially normal to the internal axis and partly extending in the direction of the internal axis;
   (d) interposing a plurality of axial threads extending in the direction of the internal axis and lying between the radial threads and over the circumferential threads positioned in step (c);
   (e) wrapping a plurality of circumferential threads around the axial threads and the internal axis, thereby drawing the axial threads against the circumferential threads wrapped in step (c);
   (f) alternately repeating step (d) and step e) until the desired predetermined dimensional woven structure is obtained; and
   (g) impregnating the formed structure with a substance for retaining the threads in position.

2. The method claimed in claim 1 in which step (b) is repeated after a performance of step (d) and before the next succeeding performance of step (e).

3. Apparatus for forming a structure having an internal axis and comprising threads of the classes: axial, radial, and circumferential, which apparatus comprises:
   (a) a plurality of disks with central aperatures and having a plurality of apertured thread guides;
   (b) means for supporting the said disks spaced from and parallel to each other, and free to be rotated around an axis which passes through their central aperatures;
   (c) means for rotating the said disks simultaneously around the said axis;
   (d) means for holding and permitting the feeding of a plurality of stores of radial thread through selected apertured thread guides in selected ones of said disks;
   (e) means for holding and permitting the feeding of a plurality of stores of circumferential thread around the radial threads between adjacent pairs of said disks; and
   (f) wherein the central apertures of said disks are larger than the final diameter of the structure to be formed to thereby permit each of a plurality of axial threads to be extended through the central aperature of said disks between separate selected pairs of adjacent radial threads.

4. The apparatus claimed in claim 3 and wherein said disks are further provided with drive apertures positioned outward of said central apertures and said apertured thread guides, and means for rotating the said disks comprising a rod extending through said drive apertures.

5. The apparatus claimed in claim 4 and wherein said drive apertures comprise a first class of drive apertures which closely fit the said rod, and a second class of drive apertures which are circumferentially extensive, so that they fit the said rod with circumferential clearance, whereby said disks in which the said rod passes through a drive aperture of the first class will be rotated without delay when the direction of rotation of the disks by the rod is reversed from a previous direction of rotation, and disks in which the said rod passes through a drive aperture of the second class will be delayed in beginning rotation relative to the disks in which the rod passes through an aperature of the first class when the direction of rotation of the disks by the rod is reversed from a previous direction of rotation.

6. The apparatus as claimed in claim 3 wherein said disks further include a plurality of apertured recesses each located between an adjacent pair of apertured thread guides and which extend away from said axis outward of said apertured thread guides to permit extension of said axial thread therethrough when the predetermined dimensional woven structure has grown to such a size that it fills a large part of the central aperture of said disks.

7. The apparatus as claimed in claim 3 further comprising manually operated means for extending said axial thread.

8. Apparatus for forming a structure having an internal axis and comprising threads of the classes: axial, radial, and circumferential, which comprises:
   (a) a helix with a central aperture larger than the diameter of the woven structure to be produced, having a plurality of apertured thread guides, and mounted for rotation around its central axis;
   (b) means for holding and permitting the feeding of a store of radial threads through selected ones of said apertured thread guides is spaced turns of said helix;
   (c) means for holding and permitting the feeding of a store of circumferential thread around the radial thread between spaced turns of the helix; and
   (d) means for selectively rotating said helix about said internal axis.

9. Apparatus as claimed in claim 8 and further including means for traversing the said store of circumferential thread in a direction parallel to the central axis of the helix.

10. Apparatus as claimed in claim 9 and further including drive means connected between the means for selectively rotating said helix and the means for traversing the said store of circumferential thread.

11. The apparatus as claimed in claim 8 further comprising means for maintaining alignment of axially spaced strands of said circumferential thread during rotation of the helix.

* * * * *